US010819618B1

(12) United States Patent
Wada et al.

(10) Patent No.: US 10,819,618 B1
(45) Date of Patent: Oct. 27, 2020

(54) NETWORK TESTING SYSTEM

(71) Applicant: Amazon Technologies, Inc., Seattle, WA (US)

(72) Inventors: Hiroshi Wada, Allawah (AU);
Shaunak Joshi, North Lakes (AU);
Brody Franks, Forresters Beach (AU);
David Munro, Bexley North (AU)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/707,855

(22) Filed: Dec. 9, 2019

(51) Int. Cl.
*H04L 12/26* (2006.01)
*H04L 12/24* (2006.01)

(52) U.S. Cl.
CPC ............. *H04L 43/50* (2013.01); *H04L 41/06* (2013.01); *H04L 41/12* (2013.01); *H04L 43/08* (2013.01)

(58) Field of Classification Search
CPC ......... H04L 41/06; H04L 43/08; H04L 41/12; H04L 43/0876; H04L 45/02; H04L 43/0823; H04L 43/50; H04L 41/0663; H04L 41/147; H04L 43/0847; H04L 41/0896; H04L 45/70; H04W 24/08; H04W 24/06; G06F 11/30; H04Q 2011/009
See application file for complete search history.

(56) References Cited

U.S. PATENT DOCUMENTS

| | | | | |
|---|---|---|---|---|
| 8,995,249 B1 * | 3/2015 | Roy | ............... | H04Q 11/0066 370/216 |
| 9,009,542 B1 * | 4/2015 | Marr | ............... | H04L 43/0817 714/47.3 |
| 9,043,658 B1 * | 5/2015 | Marr | ............... | G06F 11/2273 714/47.2 |
| 2006/0217202 A1 * | 9/2006 | Burke | ............... | G07F 17/3286 463/42 |
| 2007/0061624 A1 | 3/2007 | Apostoloiu et al. | | |
| 2011/0142077 A1 * | 6/2011 | Wong | ............... | H04J 3/0679 370/503 |
| 2011/0249572 A1 * | 10/2011 | Singhal | ............... | H04L 41/069 370/252 |
| 2011/0286348 A1 * | 11/2011 | Yamasaki | ............... | H04L 43/062 370/252 |
| 2013/0073715 A1 * | 3/2013 | Whitlock | ............... | G06F 11/0709 709/224 |

(Continued)

Primary Examiner — Sargon N Nano
(74) Attorney, Agent, or Firm — K&L Gates LLP

(57) ABSTRACT

Devices and techniques are generally described for network device failure testing. In some examples, first data may be received describing a network topology. The network topology may describe a plurality of network components arranged in communication with one another. A first set of equivalent network components and a second set of equivalent network components may be determined from the network topology. A first network performance may be determined for the network topology by simulating network communication while a first network component of the first set of equivalent network components is in an inoperable state. A first test coverage percentage may be determined for the network topology. The first test coverage percentage may be a ratio of a first number of network components of the first set of equivalent network components to a total number of the plurality of network components.

20 Claims, 5 Drawing Sheets

(56) References Cited

U.S. PATENT DOCUMENTS

| | | | |
|---|---|---|---|
| 2013/0155840 A1* | 6/2013 | Li | H04L 47/728 370/217 |
| 2015/0269048 A1* | 9/2015 | Marr | H04L 41/147 714/2 |
| 2017/0078171 A1* | 3/2017 | Tapia | H04L 65/80 |
| 2018/0212829 A1* | 7/2018 | Reid | H04L 41/0883 |
| 2018/0270676 A1* | 9/2018 | Guven | H04W 24/06 |

\* cited by examiner

NETWORK TESTING SYSTEM

BACKGROUND

Computer network topologies include an arrangement of devices, such as compute nodes, switches, routers, and/or other devices configured in communication with one another via one or more communications links. Communications links provide the communication channel that allows for communication between two communicating devices. Links may be physical links (e.g., Ethernet cables, optical cables, copper wiring, etc.) or may be logical links employing one or more underlying physical links. Network topologies are often simulated in order to test network performance prior to deploying physical devices and links. Bandwidth, throughput, latency, jitter, and/or error rate, among other potential metrics are often determined during network testing as a measure of network performance. Additionally, networks are often tested using simulated network failures (e.g., a failure of one or more devices or linkages) to determine the resulting network performance given the failure of the device and/or link.

DETAILED DESCRIPTION

Figure 1:
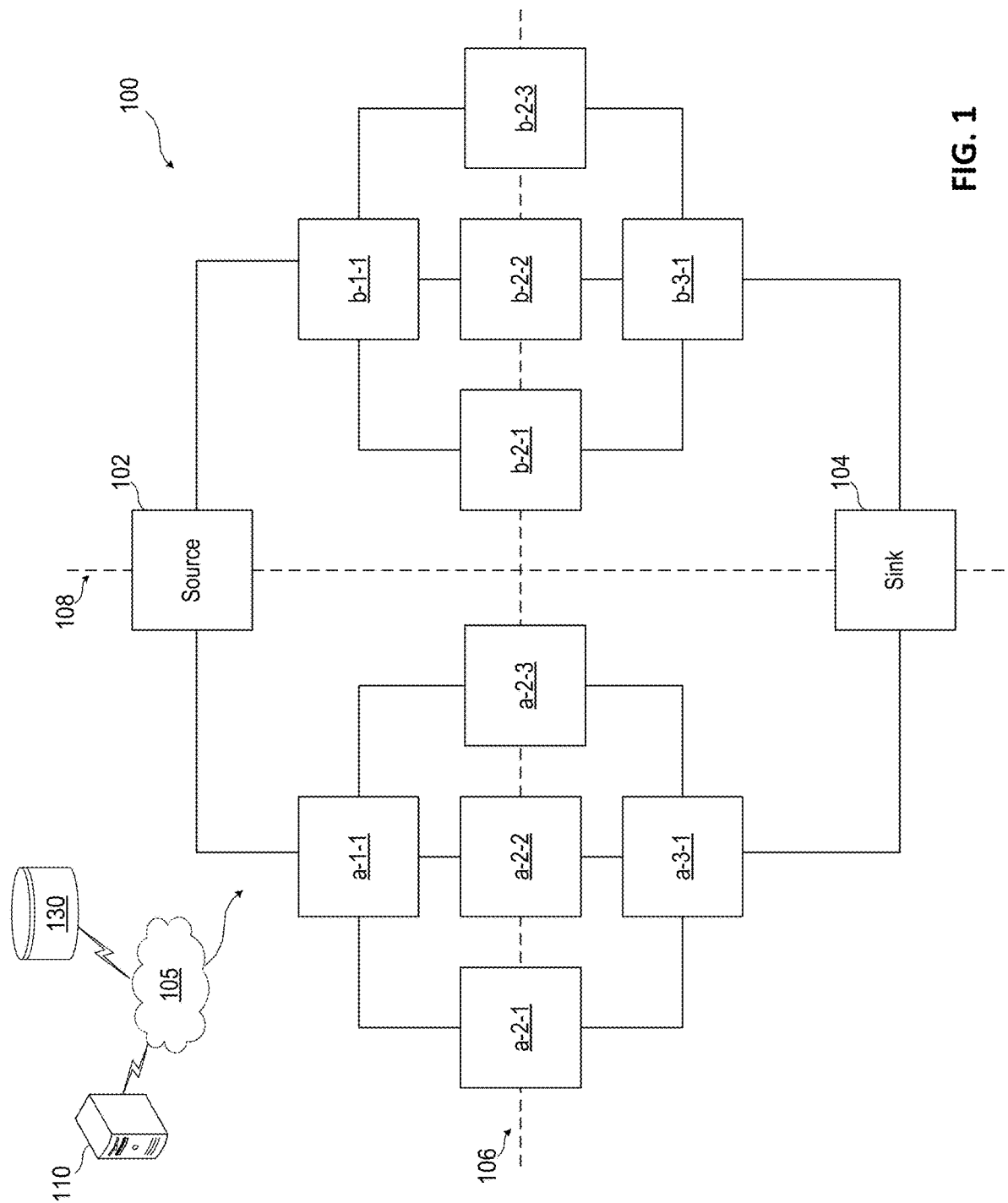
FIG. 1 is a diagram of an example network topology that may be tested using the various techniques described in the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Modern computer communication networks are large, complex, and designed for robustness to failure. Such robustness is often achieved using redundancy in network design to minimize the impact of the failure of any individual component. Prior to deployment, it may be beneficial to understand network behavior under both steady state and failure conditions (e.g., when one or more network components are in an inoperable state). It may not be practical to validate all combinations of failures even for a relatively small network topology due to the large number of possible network failure types (e.g. device hardware failures, network link failures, software component failures, etc.) and the large number of different components that may fail (e.g., network devices and/or links). Also, due to redundancy, a network may have failures that have the same impact to the network, and testing redundant components does not help to understand new failure conditions and can needlessly waste time and/or compute resources.

Current testing techniques do not account for redundancy in computer network design, and failures with the identical network impact may be tested repeatedly. Chaos testing, for example, where failures are inserted into components of a network at random in a controlled setting, is used to overcome the problem of testing all possible failures. However, chaos testing does not guarantee testing unique failure conditions and may test redundant conditions repeatedly. Accordingly, described herein are various techniques that may be used to test a given network topology for failure of constituent devices and/or links by testing only unique failure conditions and by minimizing testing time.

As used herein, "test coverage" refers to a ratio of the number of failures tested to the total number of possible failures in a given network topology. The various techniques described herein are effective to reduce the number of network components that are failure tested during network testing, without a corresponding loss in test coverage.

The network components that are selected for failure testing (e.g., the components that are selected for inoperability during a simulation) are prioritized in descending order of test coverage. Accordingly, network components whose failure testing result in the maximum amount of test coverage are tested first. Additionally, described herein is a process to evaluate the impact of each network component failure via its injection into a test network topology and via a subsequent measurement of network-wide performance.

Advantageously, the various techniques described herein offer improved testability of failure tolerance of a network topology due to a reduced set of network component failures to test without an overall loss in test coverage. Additionally, if a user opts to achieve a target test coverage of less than a 100%, the ordering of failures provided by the various techniques described herein provide that the target test coverage is achieved earlier than any other ordering of failure testing.

In various examples, a set of equivalency classes (e.g., network component failure equivalency classes) is determined. The failure of each network component of a particular equivalency class has the same impact (or approximately the same impact to within a specified tolerance) on network performance (as measured using any desired metric) as each other network component of the equivalency class. Accordingly, devices and links of a particular equivalency class may be referred to as equivalent devices and equivalent links, respectively. The rules used to define an equivalency class may be determined based on user knowledge of the network topology and/or based on properties of the network topology. In various examples, each failure equivalency class may be populated with a set of network components for failure testing based on the given network topology. The set of network components in an equivalency class may be a subset of the total number of network components in a given network topology. In various examples, a strict ordering of the equivalency classes is determined by sorting the equivalency classes in descending order of cardinality, thus ensuring that failure equivalency classes which achieve a higher test coverage are tested first. In at least some examples, injecting a network component failure from a first failure equivalency class into a test network, validating network behavior (e.g., testing the reachability between two devices and determining the test coverage), and repeating the process for each other equivalency class may be repeated until the achieved test coverage percentage is greater than or equal to the overall target test coverage percentage.

An example application is described in reference to FIG. 1 based on a sample depicted network topology. A set of equivalency rules are derived from symmetrical properties and from intra-layer redundancy of the example network topology. Equivalency rules may indicate equivalent network components insofar as failure of the indicated network components may have equivalent impacts on network performance. In the example depicted in FIG. 1, ten potential network component failures under test are reduced to only two unique failures using the techniques described herein, thus resulting in a 5× reduction in the search space of network component failures for testing without a loss of overall test coverage across possible failures. The equivalency classes are sorted in descending order of size (e.g., cardinality), to enable achievement of the highest possible test coverage in the shortest number of iterations, if a test coverage of less than 100% is targeted.

In another example embodiment, a process to evaluate the impact of each network component failure in the minimum set for a given network topology is described herein. In various examples, the network topology of interest (sometimes referred to as a "test network") is simulated using emulated virtual network software (e.g., GNS3, or a monitored lab environment). A failure is injected into the test network. Injecting a failure into a test network refers to testing network performance when a network component is in an inoperable state. Designating the network component as inoperable is often referred to as "injecting a failure" into the network. The impact of the injected failure is measured against network-wide performance. For example, latency, jitter, throughput, error rate, etc., may be tested for the network topology with the failure injected. Thereafter, the state of the emulated network may be reset and a report describing the network performance with the injected failure may be generated. Thereafter, the next failure may be injected into the test network and the process may be repeated until a target test coverage is achieved.

FIG. 1 is a diagram of an example network topology 100 that may be tested using the various techniques described in the present disclosure. In the example depicted in FIG. 1, at least one computing device 110 may be effective to perform network performance simulations according to computer-executable instructions stored in at least one non-transitory computer-readable memory 130. In various examples, the computing device 110 and the non-transitory computer-readable memory 130 may be housed within the same physical device, while in some other examples, the computing device 110 and the non-transitory computer-readable memory 130 may be separate devices communicating over a network 105 (e.g., a local area network (LAN) and/or a wide area network (WAN) such as the internet).

The example network topology 100 includes a source device 102, a sink device 104, and devices a-1-1, a-2-1, a-2-2, a-2-3, a-3-1, b-1-1, b-2-1, b-2-2, b-2-3, and b-3-1 (generally a-x-y and b-x-y). Each of the devices in network topology 100 may be a network component, such as a router, switch, and/or other device effective to receive, route, and/or send network data traffic. In addition, the solid lines connecting the various devices a-1-1, b-3-1 represent links communicatively coupling the devices as shown in FIG. 1. The various links may be physical links (e.g., Ethernet cable, optical cable, etc.) or maybe software linkages representing logical abstractions of different combinations of physical links and/or devices.

Source device 102 may be a network component effective to transmit data over the network topology. For example, source device 102 may be a network device effective to send packets of a specified size (and/or a varying size) at a specified interval, according to a desired testing procedure. Similarly, sink device 104 may be a network device effective to receive packets sent over the network topology 100 by source device 102. In at least some examples, sink device 104 may send negative and/or positive acknowledgement messages to source device 102 to communicate whether or not sink device 104 received data sent by source device 102. Packets and/or other data sent between source device 102 and sink device 104 may pass through the various network components a-1-1, . . . , b-3-1 according to various routing logic specified during testing and/or determined by the various network components.

Dashed line 106 represents a horizontal axis of symmetry for the network topology 100, while dashed line 108 represents a vertical axis of symmetry for the network topology 100. Dashed line 108 and dashed line 106 may be symmetry lines that divide the network into functionally equivalent segments. For example, network components a-1-1, a-2-1, a-2-2, a-2-3, and a-3-1 on the left hand side of dashed line 108 may be functionally equivalent to corresponding network components b-1-1, b-2-1, b-2-2, b-2-3, and b-3-1 on the right hand side of dashed line 108.

Similarly, network component a-1-1 above dashed line 106 may be functionally equivalent to network component a-3-1 below dashed line 106. Similarly, network component b-1-1 above dashed line 106 may be functionally equivalent to network component b-3-1 below dashed line 106.

Additionally, network components within the layer a-2-y may be equivalent to one another. For example, network component a-2-1 may be equivalent to network component a-2-2 which may, in turn, be equivalent to network component a-2-3. Similarly, network components within the layer b-2-y may be equivalent to one another with b-2-1 being equivalent to b-2-2 and b-2-3.

As used herein, a layer may refer to one or more network components (e.g., network devices) having the same role with regards to the routing of incoming traffic. Having multiple devices within a layer provides redundancy in routing of traffic, thus offering resiliency in network design. In various examples, network components in a layer may be configured in parallel communication with one another with respect to a preceding layer and/or to a succeeding layer. For example, in FIG. 1, components a-2-1, a-2-2, and a-2-3 may be network components in layer. Similarly, components b-2-1, b-2-2, and b-2-3 may be network components in layer. In at least some examples, components a-2-1, a-2-2, a-2-3, b-2-1, b-2-2, and b-2-3 may be considered network components in a single layer. In another example, network component a-1-1 may be considered to be in a single layer. In another example, network components a-1-1 and b-1-1 may be considered to be in a single layer within the network topology 100.

Symmetry lines (e.g., dashed lines 106, 108) may be drawn as the network topology is symmetric along these axes. Network components with prefix a- and b-construct sub-networks within the network topology 100.

From the symmetry and redundancy within the network topology 100, several equivalency rules may be determined for which single device (and/or single link) failures have equivalent impact to the network traffic capacity from the source device 102 to the sink device 104. For example:

Rule 1: network component failure on a-x-y is equivalent to network component failure on b-x-y (e.g., a-1-1 and b-1-1 are equivalent) due to the redundancy around dashed line 108.

Rule 2: network component failure on a-2-x is equivalent to network component failure on a-2-y (e.g., a-2-1 and a-2-3 are equivalent) due to the redundancy of network components in the middle layer.

Rule 3: network component failure on b-2-x is equal to network component failure on b-2-y (e.g., b-2-1 and b-2-2 are equivalent) due to the redundancy of devices in the middle layer.

Rule 4: network component failure on a-1-1 is equivalent to a-3-1 due to the symmetry around dashed line 106.

Rule 5: network component failure on b-1-1 is equivalent to b-3-1 due to the symmetry around dashed line 106.

Without deduplicating network component failures according to the rules above, there are 10 device failures (a-1-1, a-2-1, a-2-2, a-2-3, a-3-1, b-1-1, b-2-1, b-2-2, b-2-3, and b-3-1), apart from source device 102 and sink device 104, to account for in network topology 100. Accordingly, at least ten simulations must be run in order to account for the failure of each of the a-x-y and b-x-y network components without deduplication. However, using the equivalency rules described above, a number of equivalency classes may be generated. The failure of each member network component of an equivalency class has the same (and/or approximately the same, within a tolerance) impact on the network performance.

Rule 1 generates five equivalency classes: E1-1={a-1-1, b-1-1}, E1-2={a-2-1, b-2-1}, E1-3={a-2-2, b-2-2}, E1-4={a-2-3, b-2-3}, E1-5={a-3-1, b-3-1}.

Rule 2 generates one equivalency class: E2-1={a-2-1, a-2-2, a-2-3}.

Rule 3 generates one equivalency class: E3-1={b-2-1, b-2-2, b-2-3}.

Rule 4 generates one equivalency class: E4-1={a-1-1, a-3-1}.

Rule 5 generates one equivalency class: E5-1={b-1-1, b-3-1}.

By transitive property, E1-1, E1-5, E4-1, and E5-1 may be merged into one equivalency class E10=a-3-1, b-1-1, b-3-11. Similarly, the remaining equivalency classes (E1-2, E1-3, E1-4, E2-1, and E3-1) may be merged into one equivalency class E11, by transitive property where E11={a-2-1, a-2-2, a-2-3, b-2-1, b-2-2, b-2-3}.

The remaining equivalency classes may be ordered in a descending order of cardinality (e.g., the number of unique members in each set). One failure from each equivalency class may be evaluated and may account for all members of the equivalency class since the failure of one member of an equivalency class has the same impact as the failure of any other member of that equivalency class.

E11 has cardinality 6, while E10 has cardinality 4. Accordingly, a network component failure from E11 may be injected into the network topology 100 using the network simulation software. For example, a-2-1 may be selected for failure. Accordingly, the network simulation software may be operated with network component a-2-1 in an inoperable state (e.g., unable to send or receive any network traffic). After the completion of the simulation, the test coverage is 60%, as six out of 10 possible network components have been evaluated (e.g., since there are six network components in E11). If the target test coverage is <60%, the simulation may be ended since the target coverage is already at 60%. If the target test coverage is >60%, a failure may be injected from equivalency class E11) (e.g., a-1-1) yielding a test coverage of 100%. The test coverage is always 100% when one failure from each equivalency class is injected during a respective simulation (e.g., a first simulation with a first failure from a first equivalency class, a second simulation with a second failure from a second equivalency class, and so on). In the example depicted in FIG. 1, 100% test coverages is achieved by evaluating two failures over two simulations, as opposed to evaluating all ten failures. Accordingly, a 5× performance increase is achieved.

In various examples, machine learning models may be trained to identify failure redundancy and/or symmetry in network topologies. Data representative of network topologies labeled with equivalency classes (e.g., ground truth data) may be used to train such machine learning models. In addition to such machine learning approaches, rules-based and/or heuristic approaches may be used to determine equivalency classes and/or to fault test network topologies, in accordance with the various techniques described herein.

Generally, in machine learning models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

Figure 2:
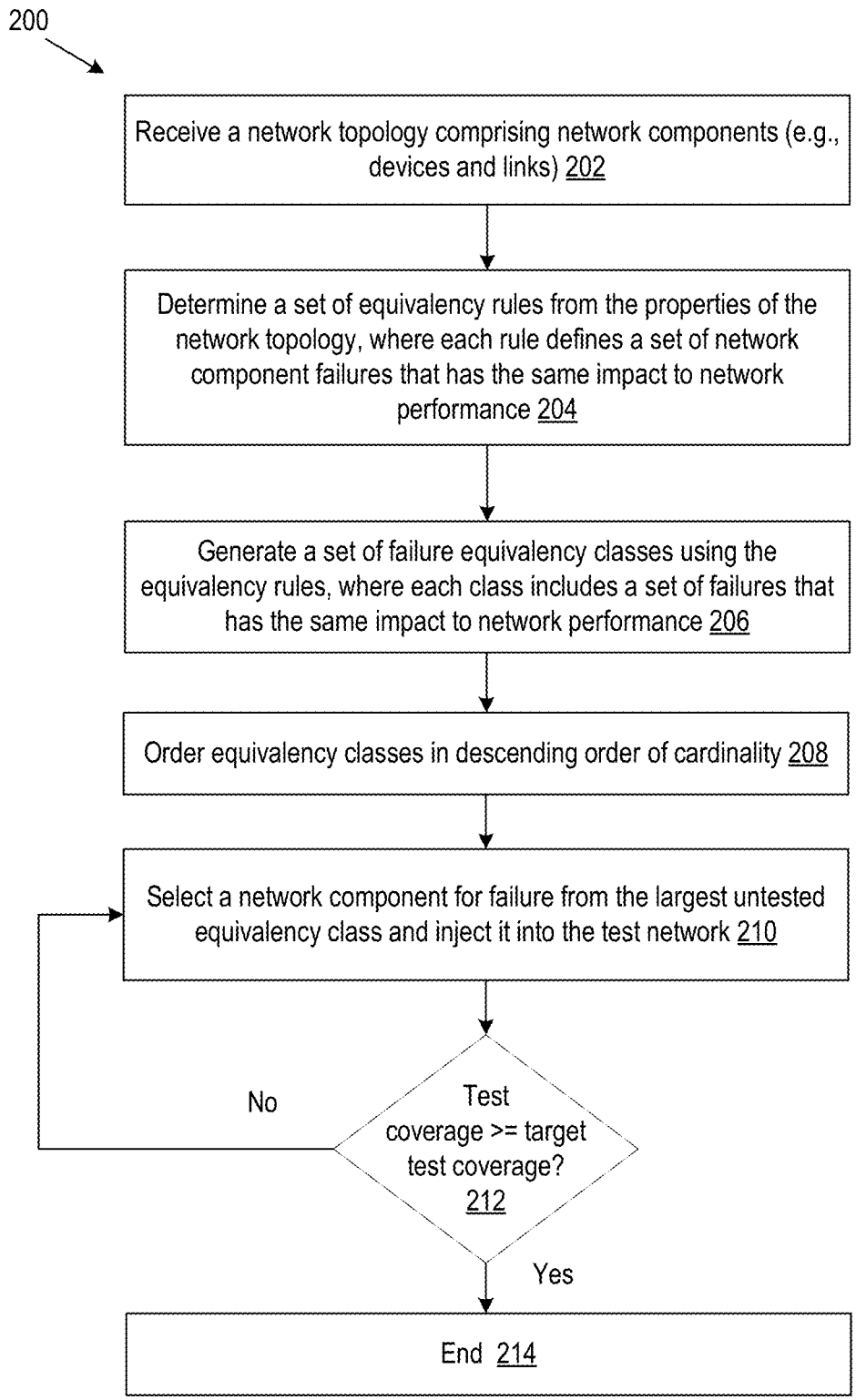
FIG. 2 is an example process that may be used to determine test coverage for a network topology, according to various embodiments of the present disclosure.

FIG. 2 depicts a flow chart showing an example process 200 for determining test coverage for a network topology, in accordance with various aspects of the present disclosure. Those portions of FIG. 2 that have been previously discussed in reference to FIG. 1 may not be described again for purposes of clarity and brevity. The actions of the process 200 may represent a series of instructions comprising computer-readable machine code executable by one or more processing units (e.g., CPUs, GPUs, tensor processors, etc.) of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the various techniques described herein.

In various examples, at action 202, a network topology may be received comprising a plurality of network components configured in communication with one another. In some examples, the network topology may be included in a particular format that is readable by simulation software executed by computing device(s) 110. The network topology may include data representing one or more network devices (e.g., computing devices, routers, switches, etc.) and data representing links between the one or more network devices. Generally, the terminology "network components" may be used herein to refer to both the network devices and the links between the network devices (whether physical devices/links or logical abstractions of physical devices/links). In some further examples, the network topology may be received in another format and may be manually input into the simulation software by an operator.

Processing may continue from action 202 to action 204, at which a set of equivalency rules may be determined from the properties of the network topology. Each equivalency rule may define a set of network components that have the same impact on the network performance (e.g., when in a failed/inoperable state). For example, two identical and/or similarly-performing switching devices that are connected in parallel (e.g., network components a-2-1 and a-2-2 in FIG. 1) may be redundant devices and may be grouped together according to an equivalency rule. Similarly, when symmetry exists in a given network topology, devices that correspond to one another in different symmetrical sub-networks may be grouped together according to an equivalency rule (e.g., network components a-1-1 and b-1-1 in FIG. 1 and network components a-1-1 and a-3-1 in FIG. 1).

In general, redundant network components (e.g., parallel devices in a layer and/or links connecting such devices), may be required to be equivalent in performance in order to be grouped together in an equivalency class. Accordingly, redundant devices grouped into an equivalency class should either by the same device (e.g., the same type of router, etc.) or should perform equivalently to one another in terms of the network performance metric being evaluated (e.g., throughput, latency, packet loss, etc.). For example, two network devices may be grouped together into an equivalency class if they have the same throughput to within a tolerance of 2%, 5%, 10%, or some other suitable percentage. Similarly, two links may be grouped together into an equivalency class if they connect parallel and/or redundant devices within the same configuration in the network topology. For example, the link coupling a-1-1 to a-2-2 may be grouped into the same equivalency class with the link coupling b-1-1 to b-2-2 in FIG. 1, assuming that the links are otherwise equivalent (e.g., the links have equivalent throughput, etc.).

Processing may continue from action 204 to action 206, at which a set of failure equivalency classes may be generated using the equivalency rules. Each class may include a set of failures that has the same impact to network performance. As described above, each network component member of an equivalency class may be a component whose failure has the same impact on network performance (e.g., in terms of the performance metric under evaluation) as the failure of any other member of the equivalency class.

Processing may continue from action 206 to action 208, order equivalency classes in descending order of cardinality. The equivalency classes generated at action 206 may be ordered from highest to lowest cardinality, such that the equivalency classes with the largest number of unique members may be tested first. Additionally, prior to ordering the equivalency classes according to cardinality, various equivalency classes may be grouped together as described above, using transitive properties of the equivalency rules determined at action 204.

Processing may continue from action 208 to action 210, at which a network component may be selected for failure from the largest (in terms of cardinality) un-tested equivalency class. The failure may be "injected" into the network for testing. "Injecting" a failure into the network refers to rendering the component inoperable during the network simulation such that the component is unable to perform its intended functions. For example, a failed link (a link in an inoperable state) may not transmit any data during simulation.

Processing may continue from action 210 to action 212 at which a determination may be made whether the current test coverage is greater than or equal to the target test coverage. For example, after testing the largest equivalency class by injecting a failed component from the largest equivalency class into the network topology during simulation, the resulting test coverage may be 40%. For example, there may be 400 network components in the largest equivalency class and 1,000 total network components in the network topology. Test coverage after testing the largest equivalency class is given by dividing the number of components in all tested equivalency classes by the total number of components in all equivalency classes. In the current example, if the target test coverage is 80%, processing may return to action 210 and the largest untested equivalency class may be tested by injecting a failed component from the largest untested equivalency class into the network and simulating network performance. Conversely, at action 212, if the current test coverage is greater than or equal to the target test coverage, processing may be ended at action 214.

Figure 3:
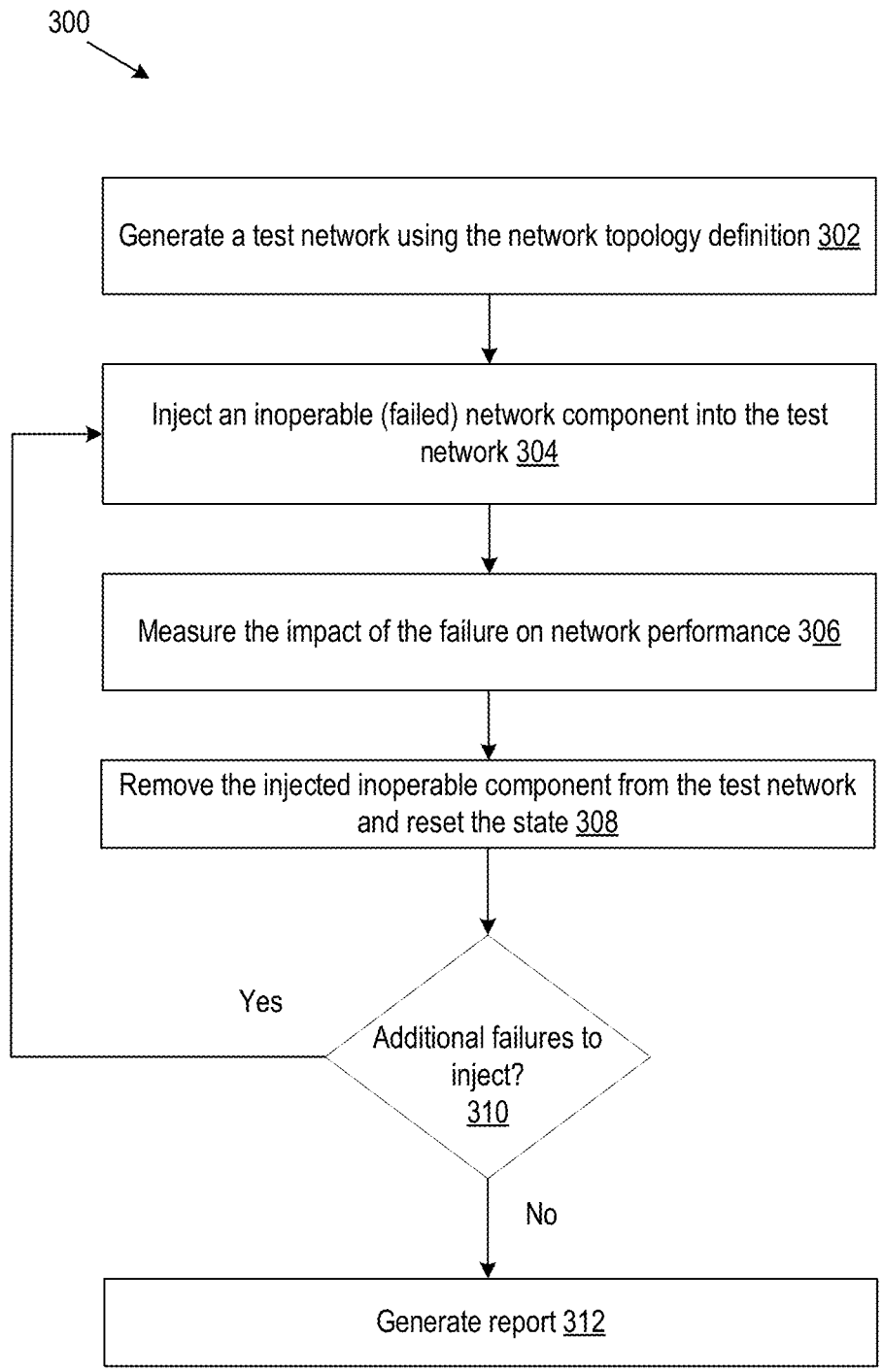
FIG. 3 is an example process that may be used to failure test a network topology, according to various embodiments of the present disclosure.

FIG. 3 depicts a flow chart showing an example process 300 for failure testing a network topology, in accordance with various aspects of the present disclosure. Those portions of FIG. 3 that have been previously discussed in reference to FIGS. 1 and 2 may not be described again for purposes of clarity and brevity. The actions of the process 300 may represent a series of instructions comprising computer-readable machine code executable by one or more processing units (e.g., CPUs, GPUs, tensor processors, etc.) of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the various techniques described herein.

Processing may begin at action 302, at which a test network may be generated using the network topology definition. For example, the network topology definition may be provided in a format that is readable by the simulation software. In another example, the network topology may be manually configured in the simulation software according to the network topology definition.

Processing may continue from action 302 to action 304, at which an inoperable (e.g., failed) network component may be injected into the test network. For example, prior to simulation, a network component that is a member of a particular equivalency class may be selected and designated as inoperable for the current simulation.

Processing may continue from action 304 to action 306, at which the impact of the injected failure on network performance may be measured during the simulation. Processing may continue from action 306 to action 308, at which the injected inoperable component may be removed from the test network and the state of the network may be reset (e.g., all routing tables may be cleared and the inoperable component may be restored to an operable state).

At action 310, a determination may be made whether there are additional failures to inject into the simulated network. The determination of whether there are additional failures to inject into the simulated network may be made based on whether the target test coverage has been reached or not. If there are additional failures to inject (e.g., based on the current test coverage being less than the target test coverage) processing may return to action 304 and another failure, from a different equivalency class, may be injected into the network for simulation. Conversely, if there are no additional failures to inject (e.g., due to the target test coverage being met), a report may be generated at action 312. The report may describe the simulated network's performance during each component-failure simulation.

Figure 4:
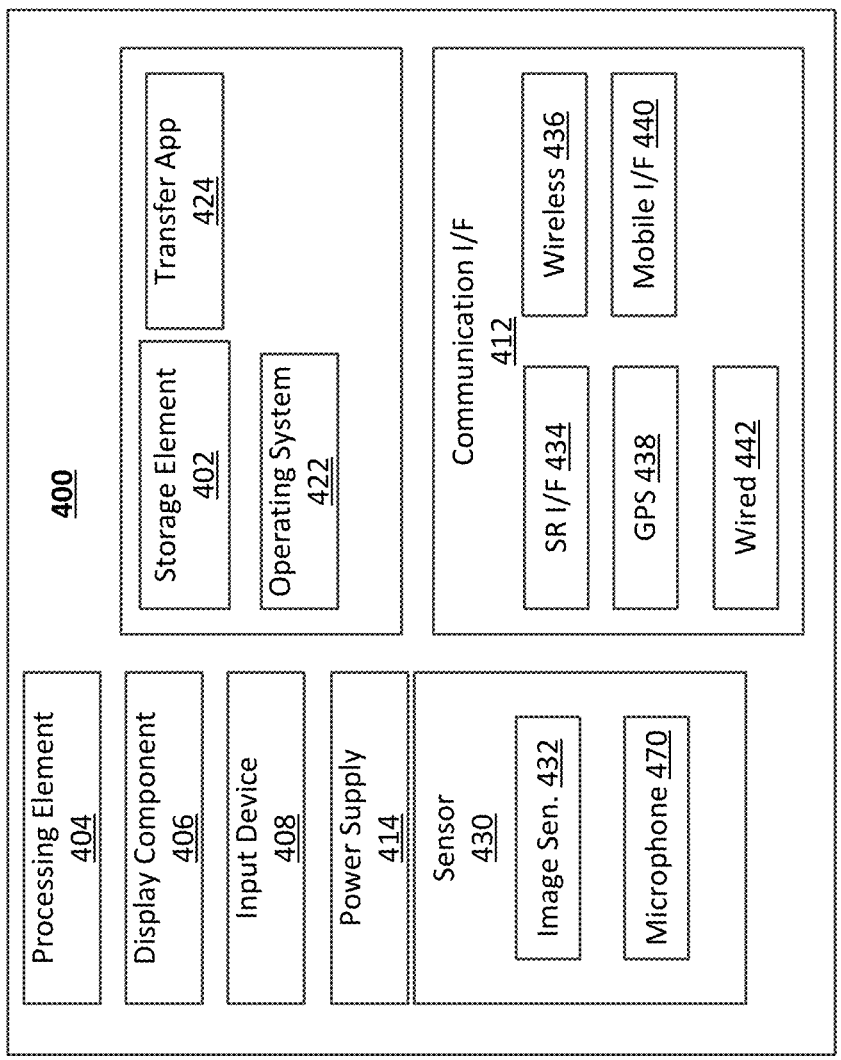
FIG. 4 is a block diagram showing an example architecture of a computing device that may be used in accordance with various embodiments described herein.

FIG. 4 is a block diagram showing an example architecture 400 of a computing device that may be used to perform dynamic filtering of search queries, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. In various examples, audio captured by microphone 470 may be streamed to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 105, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s), as described herein, are exemplary, and may be located as a stand-alone device or may be included, in whole or in part, as a component of a larger device or system.

Figure 5:
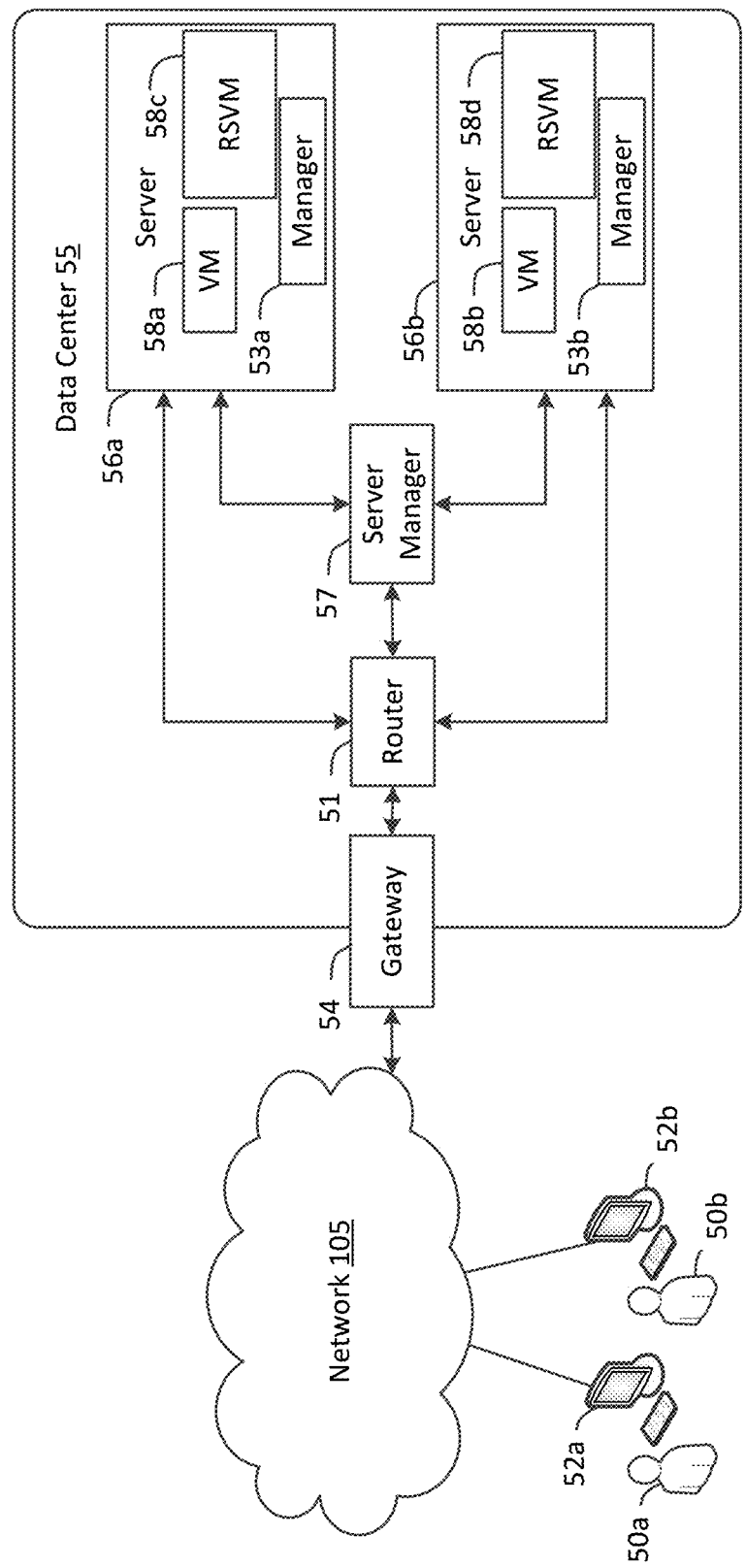
FIG. 5 is a diagram illustrating an example system for sending and providing data that may be used in accordance with the present disclosure.

An example system for determining dynamic computer-executable policies based on goal data will now be described in detail. In particular, FIG. 5 illustrates an example computing environment in which the embodiments described herein may be implemented. For example, the computing environment of FIG. 5 may be used to dynamic policy determination and/or dynamic filtering of search queries as a service over a network wherein one or more of the techniques described herein may be requested by a first computing device and may be performed by a different computing device configured in communication with the first computing device over a network. FIG. 5 is a diagram schematically illustrating an example of a data center 55 that can provide computing resources to users 50a and 50b (which may be referred herein singularly as user 50 or in the plural as users 50) via user computers 52a and 52b (which may be referred herein singularly as user computer 52 or in the plural as user computers 52) via network 105. Data center 55 may be configured to provide computing resources for executing applications on a permanent or an as-needed basis. The computing resources provided by data center 55 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 55 may include servers 56a and 56b (which may be referred herein singularly as server 56 or in the plural as servers 56) that provide computing resources. These resources may be available as bare metal resources or as virtual machine instances 58a-d (which may be referred herein singularly as virtual machine instance 58 or in the plural as virtual machine instances 58). In at least some examples, server manager 57 may control operation of and/or maintain servers 56. Virtual machine instances 58c and 58d are rendition switching virtual machine ("RSVM") instances. The RSVM virtual machine instances 58c and 58d may be configured to perform all, or any portion, of the techniques for improved rendition switching and/or any other of the disclosed techniques in accordance with the present disclosure and described in detail above. As should be appreciated, while the particular example illustrated in FIG. 5 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, network 105 may, for example, be a publicly accessible network of linked networks and possibly operated by various distinct parties, such as the Internet. In other embodiments, network 105 may be a private network, such as a corporate or university network that is wholly or partially inaccessible to non-privileged users. In still other embodiments, network 105 may include one or more private networks with access to and/or from the Internet.

Network 105 may provide access to user computers 52. User computers 52 may be computers utilized by users 50 or other customers of data center 55. For instance, user computer 52a or 52b may be a server, a desktop or laptop personal computer, a tablet computer, a wireless telephone, a personal digital assistant (PDA), an e-book reader, a game console, a set-top box or any other computing device capable of accessing data center 55. User computer 52a or 52b may connect directly to the Internet (e.g., via a cable modem or a Digital Subscriber Line (DSL)). Although only two user computers 52a and 52b are depicted, it should be appreciated that there may be multiple user computers.

User computers 52 may also be utilized to configure aspects of the computing resources provided by data center 55. In this regard, data center 55 might provide a gateway or web interface through which aspects of its operation may be configured through the use of a web browser application program executing on user computer 52. Alternately, a stand-alone application program executing on user computer 52 might access an application programming interface (API) exposed by data center 55 for performing the configuration operations. Other mechanisms for configuring the operation of various web services available at data center 55 might also be utilized.

Servers 56 shown in FIG. 5 may be servers configured appropriately for providing the computing resources described above and may provide computing resources for executing one or more web services and/or applications. In one embodiment, the computing resources may be virtual machine instances 58. In the example of virtual machine instances, each of the servers 56 may be configured to execute an instance manager 53a or 53b (which may be referred herein singularly as instance manager 53 or in the plural as instance managers 53) capable of executing the virtual machine instances 58. The instance managers 53 may be a virtual machine monitor (VMM) or another type of program configured to enable the execution of virtual machine instances 58 on server 56, for example. As discussed above, each of the virtual machine instances 58 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 55 shown in FIG. 5, a router 51 may be utilized to interconnect the servers 56a and 56b. Router 51 may also be connected to gateway 54, which is connected to network 105. Router 51 may be connected to one or more load balancers, and alone or in combination may manage communications within networks in data center 55, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 55 shown in FIG. 5, a data center 55 is also employed to at least in part direct various communications to, from and/or between servers 56a and 56b. While FIG. 5 depicts router 51 positioned between gateway 54 and data center 55, this is merely an exemplary configuration. In some cases, for example, data center 55 may be positioned between gateway 54 and router 51. Data center 55 may, in some cases, examine portions of incoming communications from user computers 52 to determine one or more appropriate servers 56 to receive and/or process the incoming communications. Data center 55 may determine appropriate servers to receive and/or process the incoming communications based on factors such as an identity, location or other attributes associated with user computers 52, a nature of a task with which the communications are associated, a priority of a task with which the communications are associated, a duration of a task with which the communications are associated, a size and/or estimated resource usage of a task with which the communications are associated and many other factors. Data center 55 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 55 described in FIG. 5 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method for failure testing in computer networks, the method comprising:
receiving first data describing a network topology comprising a plurality of devices configured in communication with one another over a communication network; determining a first equivalency rule defining first equivalent devices among the plurality of devices;
determining a second equivalency rule defining second equivalent devices among the plurality of devices;
determining a first subset of the plurality of devices according to the first equivalency rule, wherein each device of the first subset is one of the first equivalent devices;
determining a second subset of the plurality of devices according to the second equivalency rule, wherein each device of the second subset is one of the second equivalent devices;
selecting a first device of the first subset for failure during a first test of the network topology;
testing the network topology according to the first test;

determining a first test coverage of the first test, wherein the first test coverage is a ratio of a first number of devices in the first subset to a total number of the plurality of devices; and comparing the first test coverage to a target test coverage.

2. The computer-implemented method of claim 1, further comprising:

determining that the first test coverage of the first test is less than the target test coverage;

selecting a second device of the second subset for failure during a second test of the network topology;

testing the network topology according to the second test; and determining a second test coverage of the second test, wherein the second test coverage is a ratio of the first number of devices in the first subset together with a second number of devices in the second subset to the total number of the plurality of devices.

3. The computer-implemented method of claim 2, further comprising:

determining a first cardinality of the first subset of the plurality of devices;

determining a second cardinality of the second subset of the plurality of devices;

determining that the first cardinality is greater than the second cardinality of the plurality of devices; and testing the network topology according to the first test prior to testing the network topology according to the second test in response to the first cardinality being greater than the second cardinality.

4. The computer-implemented method of claim 1, further comprising:

receiving second data describing the network topology comprising a plurality of links used for network communication;

determining a third equivalency rule defining first equivalent links among the plurality of links;

determining a fourth equivalency rule defining second equivalent links among the plurality of links;

determining a third subset of the plurality of links according to the third equivalency rule, wherein each link of the third subset is one of the first equivalent links;

determining a fourth subset of the plurality of links according to the fourth equivalency rule, wherein each link of the fourth subset is one of the second equivalent links;

selecting a first link of the third subset for failure during a second test of the network topology;

testing the network topology according to the second test, wherein no packets are permitted to traverse the first link during the second test; and determining a second test coverage of the first test, wherein the second test coverage is a ratio of a second number of links in the third subset to a total number of the plurality of links.

5. A method of network testing, comprising:

receiving first data describing a network topology, wherein the network topology comprises a plurality of network components arranged in communication with one another;

determining a first set of equivalent network components of the plurality of network components;

determining a second set of equivalent network components of the plurality of network components;

determining a first network performance for the network topology by simulating network communication while at least a first network component of the first set of equivalent network components is in an inoperable state;

determining a first test coverage for the network topology, wherein the first test coverage is a ratio of a first number of network components of the first set of equivalent network components to a total number of the plurality of network components; and comparing the first test coverage to a target test coverage.

6. The method of claim 5, further comprising:

determining the first number of network components of the first set of equivalent network components;

determining a second number of network components of the second set of equivalent network components;

determining that the first number of network components is greater than the second number of network components; and selecting the first network component from among the first set of equivalent network components to be in the inoperable state based at least in part on the first number of network components being greater than the second number of network components.

7. The method of claim 5, further comprising:

determining that the first network component is a redundant network component in the same layer as a second network component; and determining that the first set of equivalent network components includes the first network component and the second network component.

8. The method of claim 5, further comprising:

determining that the first set of equivalent network components is equivalent to the second set of equivalent network components according to a transitive property of an equivalency rule; and merging the second set of equivalent network components into the first set of equivalent network components.

9. The method of claim 5, further comprising:

determining a first equivalency rule indicating network components within a first layer of the network topology are equivalent;

determining that the first network component and a second network component are within the first layer of the network topology;

determining that the first set of equivalent network components includes the first network component and the second network component;

determining a second equivalency rule indicating that network components of a second layer of the network topology are equivalent to network components of the first layer;

determining that a third network component is within the second layer of the network topology; and determining that the first set of equivalent network components includes the third network component.

10. The method of claim 5, further comprising determining one or more of the following: throughput, latency, jitter, or packet loss, as the first network performance for the network topology by simulating network communication while the first network component of the first set of equivalent network components is in the inoperable state.

11. The method of claim 5, further comprising:

determining, from the first data describing the network topology, a first symmetry within the network topology; and determining the first set of equivalent network components of the plurality of network components based at least in part on the first symmetry.

12. The method of claim 5, further comprising:
  determining a set of equivalency classes of the network topology; and
  selecting a respective network component from among each equivalency class of the set of equivalency classes for failure during a test of the network topology.

13. The method of claim 12, further comprising:
  determining that the first test coverage is less than the target test coverage;
  determining a second network performance for the network topology by simulating network communication while a second network component of the second set of equivalent network components is in the inoperable state;
  determining a second test coverage for the network topology, wherein the second test coverage is a second ratio of the first number of network components of the first set of equivalent network components plus a second number of the second set of equivalent network components to a total number of the plurality of network components; and
  determining that the second test coverage is greater than or equal to the target test coverage.

14. A computing device, comprising:
  at least one processor; and
  at least one non-transitory computer-readable memory storing instructions that, when executed by the at least one processor, are effective to program the at least one processor to:
    receive first data describing a network topology, wherein the network topology comprises a plurality of network components arranged in communication with one another;
    determine a first set of equivalent network components of the plurality of network components;
    determining a second set of equivalent network components of the plurality of network components;
    determine a first network performance for the network topology by simulating network communication while a first network component of the first set of equivalent network components is in an inoperable state;
    determine a first test coverage for the network topology, wherein the first test coverage is a ratio of a first number of network components of the first set of equivalent network components to a total number of the plurality of network components; and
    determine that the first test coverage is greater than or equal to a target test coverage.

15. The computing device of claim 14, the at least one non-transitory computer-readable memory storing further instructions that, when executed by the at least one processor, are further effective to program the at least one processor to:
  determine the first number of network components of the first set of equivalent network components;
  determine a second number of network components of the second set of equivalent network components;
  determine that the first number of network components is greater than the second number of network components; and
  select the first network component from among the first set of equivalent network components to be in the inoperable state based at least in part on the first number of network components being greater than the second number of network components.

16. The computing device of claim 14, the at least one non-transitory computer-readable memory storing further instructions that, when executed by the at least one processor, are further effective to program the at least one processor to:
  determine that the first network component is a redundant network component in the same layer as a second network component; and
  determine that the first set of equivalent network components includes the first network component and the second network component.

17. The computing device of claim 14, the at least one non-transitory computer-readable memory storing further instructions that, when executed by the at least one processor, are further effective to program the at least one processor to:
  determine one or more of the following: throughput, latency, jitter, or packet loss, as the first network performance for the network topology by simulating network communication while the first network component of the first set of equivalent network components is in the inoperable state.

18. The computing device of claim 14, the at least one non-transitory computer-readable memory storing further instructions that, when executed by the at least one processor, are further effective to program the at least one processor to:
  determine, from the first data describing the network topology, a first symmetry within the network topology; and
  determine the first set of equivalent network components of the plurality of network components based at least in part on the first symmetry.

19. The computing device of claim 14, the at least one non-transitory computer-readable memory storing further instructions that, when executed by the at least one processor, are further effective to program the at least one processor to:
  determine a set of equivalency classes of the network topology; and
  select a respective network component from among each equivalency class of the set of equivalency classes for failure during a test of the network topology.

20. The computing device of claim 14, the at least one non-transitory computer-readable memory storing further instructions that, when executed by the at least one processor, are further effective to program the at least one processor to:
  determine that the first test coverage is less than the target test coverage;
  determine a second network performance for the network topology by simulating network communication while a second network component of the second set of equivalent network components is in the inoperable state;
  determine a second test coverage for the network topology, wherein the second test coverage is a second ratio of the first number of network components of the first set of equivalent network components plus a second number of the second set of equivalent network components to a total number of the plurality of network components; and
  determine that the second test coverage is greater than or equal to the target test coverage.

* * * * *